United States Patent
Osada et al.

(10) Patent No.: US 8,137,433 B2
(45) Date of Patent: Mar. 20, 2012

(54) METHOD OF REGENERATING METAL, REGENERATED METAL, MATERIAL FOR LITHOGRAPHIC PRINTING PLATE BASES, AND LITHOGRAPHIC PRINTING PLATE

(75) Inventors: Masakazu Osada, Shizuoka (JP); Toru Yamazaki, Shizuoka (JP); Keiji Akiyama, Shizuoka (JP); Yoshio Okishi, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/810,645

(22) PCT Filed: Dec. 25, 2008

(86) PCT No.: PCT/JP2008/073547
§ 371 (c)(1),
(2), (4) Date: Jun. 25, 2010

(87) PCT Pub. No.: WO2009/084568
PCT Pub. Date: Jul. 9, 2009

(65) Prior Publication Data
US 2010/0275733 A1    Nov. 4, 2010

(30) Foreign Application Priority Data

Dec. 28, 2007  (JP) ................................ 2007-340289

(51) Int. Cl.
*C22B 7/00*    (2006.01)
(52) U.S. Cl. .......................................... 75/401; 75/686
(58) Field of Classification Search ................. 75/686, 75/401, 687
See application file for complete search history.

(56) References Cited

FOREIGN PATENT DOCUMENTS

| JP | 1-268826 | A | | 10/1989 |
|----|----------|---|---|---------|
| JP | 7-205534 | A | | 8/1995 |
| JP | 2002-225449 | A | | 8/2002 |
| JP | 2002225449 | A | * | 8/2002 |
| JP | 3420817 | B2 | | 6/2003 |
| JP | 2005-186415 | A | | 7/2005 |
| JP | 2007-63583 | A | | 3/2007 |

OTHER PUBLICATIONS

Machine translation JP 2002-225449 published Aug. 2002.*
Al, Cu, Fe, and Si. ProKon version 8.6, copyright 1997-1998 Harold Schwartz for The Calculation Companion.*
International Search Report, dated Feb. 3, 2009, issued in corresponding application PCT/JP2008/073547.
European Search report issued in European patent application No. 08868693.6 on Oct. 7, 2011.

* cited by examiner

*Primary Examiner* — George Wyszomierski
*Assistant Examiner* — Tima M McGuthry Banks
(74) *Attorney, Agent, or Firm* — Birch, Stewart, Kolasch & Birch, LLP.

(57) ABSTRACT

A metal regeneration method including: a melting furnace cleaning step of melting pure aluminum with an aluminum content of 99.5% by weight or higher in a melting furnace to clean the inside of the melting furnace; and a metal regeneration step of melting waste lithographic printing plates selected from unused lithographic printing plates and used lithographic printing plates, in the melting furnace whose inside has been cleaned by the melting furnace cleaning step, to obtain regenerated metal.

5 Claims, No Drawings

METHOD OF REGENERATING METAL, REGENERATED METAL, MATERIAL FOR LITHOGRAPHIC PRINTING PLATE BASES, AND LITHOGRAPHIC PRINTING PLATE

This application is the national stage application of application No. PCT/JP2008/073547, which was filed on Dec. 25, 2008. This application further claims priority under 35 U.S.C. §119(a)-(d) to Japanese application No. 2007-340289, filed on Dec. 28, 2007. The contents of the above applications is hereby incorporated by reference.

TECHNICAL FIELD

The present invention relates to a metal regeneration method, regenerated metal, material for lithographic printing plate bases, and lithographic printing plate.

RELATED ART

Used lithographic printing plates and trimmings arising when slitting and chopping a lithographic printing web to specific dimensions on a production line have, until now, been discarded. However, these are mostly formed from sheets of pure aluminum or aluminum alloy.

Consequently, if used lithographic printing plates and trimmings can be regenerated and used as regenerated metal then this would be economically efficient.

As a method for reusing used lithographic printing plates and trimmings as metal, a manufacturing method of a support for a lithographic plate is, for example, proposed (Japanese Patent Application Laid-Open (JP-A) No. 2005-186415) that includes: a process of removing an image recording layer and adhered matter from the used lithographic printing plates and/or unused lithographic plates; a process of obtaining molten aluminum by melting the used lithographic printing plates and/or unused lithographic plates from which the image recording layer and the adhered matter has been removed; a process of obtaining an aluminum alloy plate from the molten aluminum; and a process of obtaining the support for the lithographic plate by applying surface treatment to the aluminum alloy plate.

There is also a production method of a support for a planographic printing plate proposed (Japanese Patent No. 3420817) in which a raw material used for melting contains used planographic printing plates at an amount of 1% or higher, gas treatment of the molten metal and filtering using a filter member are performed prior to casting, after impurities and $H_2$ gas have been removed casting is performed, then, after making into thin aluminum plate by performing one or other, or both, of cold rolling and/or heat treatment, straightening and surface roughening are performed.

DISCLOSURE OF THE INVENTION

Problem to be Solved by the Invention

However, standard ranges are determined for the trace component concentrations of Si, Fe, Cu, Mn and the like contained in bases for lithographic printing plates, depending on the product type.

When used lithographic printing plates and trimmings are simply melted, and a lithographic printing plate base is manufactured with regenerated metal that is regenerated as a base of a lithographic printing plate as the raw material, sometimes the trace component concentrations exceed the standard ranges.

In such cases, the trace component concentrations are adjusted to within the standard ranges by adding new metal to the regenerated metal and melting.

However, when the trace component concentrations are too high in the regenerated metal, the blending amount of the regenerated metal is limited, and it becomes a problem to increase the amount of regenerated metal used and reduce the amount of new metal, from newly refined aluminum, used.

The present invention addresses the above problems, and an object thereof is to provide a metal regeneration method obtaining regenerated metal with a smaller proportion of trace components than conventionally, regenerated metal manufactured by the metal regeneration method, material for lithographic printing plate bases containing the regenerated metal, and a lithographic printing plate using the base for a lithographic printing plate.

Method of Solving the Problem

The first embodiment of the invention relates to a metal regeneration method including: a melting furnace cleaning step of melting pure aluminum with an aluminum content of 99.5% by weight or higher in a melting furnace to clean the inside of the melting furnace; and a metal regeneration step of melting waste lithographic printing plates selected from unused lithographic printing plates and used lithographic printing plates, in the melting furnace whose inside has been cleaned by the melting furnace cleaning step, to obtain regenerated metal.

The second embodiment of the invention is the metal regeneration method of the first embodiment of the invention, wherein the total amount of photosensitive layer, photosensitive layer protection material, and packaging material of the waste lithographic printing plates used in the metal regeneration step is 1% by weight or lower.

The third embodiment of the invention is the metal regeneration method of the first or second embodiment of the invention, wherein the size of the waste lithographic printing plates used in the metal regeneration step is from 2 to 60 cm square.

The fourth embodiment of the invention is the metal regeneration method of the first, second or third embodiment of the invention, wherein a Si free furnace whose furnace walls do not contain Si is employed as the melting furnace.

The fifth embodiment of the invention is the metal regeneration method of the first, second, third or fourth embodiment of the invention, wherein the temperature for melting the waste lithographic printing plates in the metal regeneration step is 680 to 750° C.

The sixth embodiment of the invention relates to regenerated metal manufactured from waste lithographic printing plates by the metal regeneration method of the first, second, third, fourth of fifth embodiment of the invention.

The seventh embodiment of the invention relates to a material for lithographic printing plate bases obtained by melting 10 to 65% by weight of the regenerated metal of the sixth embodiment of the invention, and 35 to 90% by weight of pure aluminum having an aluminum purity of 99.5% or higher, mixing, and solidifying.

The eighth embodiment of the invention relates to a lithographic printing plate including a base of a strip shaped body, obtained by rolling the material for lithographic printing plate bases of the seventh embodiment of the invention, roughened on at least one surface, and a plate-making layer formed on the roughened face of the base.

EFFECT OF THE INVENTION

In the metal regeneration method recited in the first embodiment of the invention, due to the regenerated metal being manufactured by melting waste lithographic printing plates employing a melting furnace whose inside has been cleaned with pure aluminum, incorporation of traces of elements from the furnace walls can be suppressed, compared to cases where a melting furnace that has not been cleaned on the inside by pure aluminum is employed.

In the metal regeneration method recited in the second embodiment of the invention, due to waste lithographic printing plates with a total amount of photosensitive layer, photosensitive layer protection material, and packaging material of 1% by weight or lower being used in the metal regeneration step, the regenerated metal yield, this being the proportion of regenerated metal with respect to the introduced waste lithographic printing plates, is high in comparison to cases where waste lithographic printing plates with a total amount of photosensitive layer, photosensitive layer protection material, and packaging material exceeding 1% by weight are used. Further, there is hardly any probability of fires in the filtering fabric when a filter fabric is used for straining molten metal in the metal regeneration step.

In the metal regeneration method recited in the third embodiment of the invention, due to the size of the waste lithographic printing plates used in the metal regeneration step being from 2 to 60 cm square, the melting time of the waste lithographic printing plates can be shortened in comparison to cases where waste lithographic printing plates of size exceeding 60 cm square are used, and the regenerated metal yield is also higher in comparison to cases where waste lithographic printing plates of a size smaller than 2 cm square are used.

In the metal regeneration method recited in the fourth embodiment of the invention, due to employing a Si free furnace as the melting furnace, a reduction in concentration of Si in the obtained regenerated metal can be made, in comparison to cases where waste lithographic printing plates are melted employing a standard melting furnace with Si containing furnace walls.

In the metal regeneration method recited in the fifth embodiment of the invention, due to melting the waste lithographic printing plates in the metal regeneration step at a temperature in the range of 680 to 750° C., the melting time per unit of weight (for example tonne) of the waste lithographic printing plates is shorter in comparison to cases where the melting temperature of the waste lithographic printing plate is less than 680° C. Further, the regenerated metal yield is high in comparison to cases of melting at a melting temperature exceeding 750° C.

In the regenerated metal recited in the sixth embodiment of the invention, due to being manufactured from waste lithographic printing plates using the metal regeneration method recited in the first, second, third, fourth or fifth embodiment of the invention, the concentration of trace components is small, for example in comparison to regenerated metal manufactured in a melting furnace not cleaned on the inside with pure aluminum.

Consequently, when regenerated metal is mixed in with pure aluminum, and melted and mixed in with new metal as a material for lithographic printing plate bases, due to a greater blending amount of regenerated metal being possible for the same standard of trace component concentration, the amount of pure aluminum and new metal used can be reduced, and consequently the amount of expensive refined aluminum imported to Japan can be decreased.

In the material for lithographic printing plate bases recited in the seventh embodiment of the invention, by using the regenerated metal recited in the sixth embodiment of the invention as regenerated metal, a greater amount of 10 to 60% by weight of regenerated metal can be incorporated, in comparison to cases where regenerated metal manufactured in a melting furnace to which no cleaning with pure aluminum has been performed. Consequently, since an equivalent amount of pure aluminum can be saved, cost is lower.

In the lithographic printing plate recited in the eighth embodiment of the invention, due to using a base formed from the material for lithographic printing plate base recited in the seventh embodiment of the invention, the trace component content in the base is within a specific standard range. Consequently, even though the raw material of the base includes a large amount of regenerated metal, 10 to 65% by weight, defective quality caused by excessive trace components can be prevented.

BEST MODE OF IMPLEMENTING THE INVENTION

1. Metal Regeneration Method

The metal regeneration method of the present invention, as described above, includes a melting furnace cleaning step and a metal regeneration step. Explanation follows below of each of the steps in the metal regeneration method of the present invention.

1-1 Melting Furnace Cleaning Step

In the melting furnace cleaning step, pure aluminum is introduced into a melting furnace for melting aluminum or alloys thereof, and after the introduced pure aluminum has melted, by removing substantially the whole amount of the melted pure aluminum from a molten metal extraction outlet of the melting furnace, the inside of the melting furnace is cleaned.

The number of times for cleaning the melting furnace is usual one or two times, and the effect of the present invention can be sufficiently obtained with one time. However, when a melting furnace dedicated to pure aluminum is employed in the metal regeneration method of the present invention, since the inside thereof is already in a state cleaned by pure aluminum, there is no need to specifically clean the inside of the melting furnace with pure aluminum prior to using the melting furnace.

The pure aluminum used in the melting furnace cleaning step is an aluminum alloy having an aluminum content of 99.5% or higher by weight, and specific examples include aluminum alloys such as A1085, A1080, A1070, and A1050 and the like.

While there is no particular limitation to the type or capacity of the melting furnace, a direct heating type with burners provided inside for directly heating waste lithographic printing plates, and having a capacity of 1 to 20 tonnes, is preferably employed from the perspective of preventing impurity metal incorporation in, or oxidization of, the obtained regenerated metal.

Further, a Si free furnace, having heat resistant tiles lining the melting furnace that do not contain Si, is preferable. Examples of Si free furnaces include melting furnaces internally lined with non-silica heat resistant materials, having main components other than silica, such as alumina heat resistant materials, high alumina heat resistant materials, zircon heat resistant materials, graphite heat resistant materials, and the like.

1-2 Metal Regeneration Step

In the metal regeneration step, waste lithographic printing plates are introduced into the melting furnace that has been internally cleaned by the melting furnace cleaning step, and melted.

As waste lithographic printing plates that can be employed there is, as described above, unused lithographic printing plates and used lithographic printing plates.

As used lithographic printing plates there is cutting waste arising when a lithographic printing web is slit and chopped to specific widths and lengths, rejects arising through processing problems, returns that have been returned from a customer in an unused state after shipping, and the like.

Used lithographic printing plates are printing plates made into plates at the customer side that have been used for printing.

For both unused lithographic printing plates and used lithographic printing plates, an aluminum web in which the proportions of trace components has been adjusted for use as a lithographic printing plate is employed as a base, however, content of aluminum and trace components does not differ between the lithographic printing plates prior to use and after use. Consequently, any difference between the unused lithographic printing plates and the used lithographic printing plates amounts to printing ink not being adhered to the surface of the former, and printing ink being adhered to the surface of the later. However, the adhered amount of printing ink is at a sufficiently small level so as to be ignored relative to the weight of the base. Further, from the used lithographic printing plates, any having a heavy buildup of printing ink adhered thereto can be removed by surface checks, such as visual inspection. Consequently, there is no particular limitation to the proportions of unused lithographic printing plates and used lithographic printing plates, and both unused lithographic printing plates and used lithographic printing plates may be used alone, or a combination of unused lithographic printing plates and used lithographic printing plates may be used.

A lithographic printing web is normally slit and chopped in a state in which a strip shaped interleaving paper is superimposed on the plate-making layer. Further, a lithographic printing web has a photosensitive or heat sensitive plate-making layer formed on a roughened surface face of the strip shaped base. Consequently, interleaving paper and plate-making layers are often incorporated in a cutting waste or rejects. Further, when shipped lithographic printing plates are returned in an unused state from a customer, considering that returns are usually in a wrapped state, as well as interleaving paper and plate-making layers, internal packaging materials, such as light-blocking paper or the like, and wrapping materials such as adhesive tape or the like for fixing the internal packaging materials, are often incorporated with returns.

The incorporated amount of combustible impurities, of such contained interleaving paper, plate-making layers, and packaging materials, is preferably 1% by weight or lower with respect to the waste lithographic printing plates. If the incorporated amount of combustible impurities is 1% by weight or lower, then as stated above, the regenerated metal yield is higher in comparison to when the incorporated amount of combustible impurities exceeds 1% by weight, and there is hardly any probability of fires in the filtering fabric when a filter fabric is used for straining molten metal in the metal regeneration step.

When the incorporated amount of combustible impurities on the waste lithographic printing plates exceeds 1%, interleaving paper and packaging materials can be removed by placing the waste lithographic printing plates, cut up to a specific size together with the combustible impurities, into a tank or cyclone, and separating the interleaving paper and packaging materials from the waste lithographic printing plate using differences in relative density or differences in centrifugal force. The plate-making layer can be removed by washing the waste lithographic printing plates, from which interleaving paper and packaging has been removed, in an organic solvent or lithographic printing plate developing liquid. However, due to the weight of the plate-making layer being considerably smaller in comparison to the weights of the base, and the interleaving paper and packaging, even if the incorporated amount of combustible impurities exceeds 1%, it is often sufficient just to remove the interleaving paper and packaging.

Further, as stated above, the meting temperature is preferably in the range of 680 to 750° C., from the perspective of balancing the time for melting against the metal regeneration ratio.

The size of the waste lithographic printing plates, as stated above, is preferably 2 to 60 cm square.

Melting of the waste lithographic printing plates can be performed in a so-called batch method in which heating and melting are performed after a specific amount of waste lithographic printing plates has been introduced, however, from the perspectives of operational efficiency and maintaining quality, melting is preferably by so-called continuous pour, in which new waste lithographic printing plates are added in a state in which molten metal is still present in the melting furnace. When the waste lithographic printing plates are melted by continuous pour, while it depends on the capacity of the melting furnace, the addition amount of the waste lithographic printing plates is preferably about 1 to 20 tonnes at a time, and about 10 tonnes is particularly preferable.

The molten metal from the melted waste lithographic printing plates can be poured into molds and made into ingots of a specific shape and weight (50 to 1500 kg). Ingots of pure aluminum may be introduced and melted in the molten metal, to give the material for lithographic printing plate bases of the present invention.

2. Material for Lithographic Printing Plate Bases

The material for lithographic printing plate bases of the present invention is, as stated above, a material obtained by melting 10 to 65% by weight of regenerated metal obtained by the metal regeneration method and 35 to 90% by weight of pure aluminum, mixing together, and then, solidifying obtained molten metal.

The material for lithographic printing plate bases of the present invention can be prepared by melting waste lithographic printing plate in a melting furnace internally cleaned by the melting furnace cleaning step to give regenerated metal, and, without solidifying the regenerated metal, introducing a specific amount of ingots of pure aluminum to the molten metal of the regenerated metal, stirring, and melting.

Further, the regenerated metal may be solidified into an ingot, and then, with both the ingots of regenerated metal and ingots of pure aluminum can be melted in a melting furnace.

Details regarding pure aluminum are as described above in "1. Regenerated Metal". The material for lithographic printing plate bases prepared by the above procedure may, after adding thereto, as required, traces of elements, such as Si, Fe, Cu, Mn or the like, be solidified into a specific shape as ingots, or may be as slabs from continuous casting or as plate material. As continuous casting, there are methods employing a cooling belt, such as a Hazelett method or the like, and methods employing a chill roll, such as a Hunter method, a 3C method, or the like.

Ingots, slabs, and plate material of the material for lithographic printing plate bases obtained by such processes, may be made into a strip shaped member by rolling to a specific thickness and subjecting to annealing as required. Then a lithographic printing plate base can be formed by surface roughening one, or both, face(s) of the obtained strip shaped member. For the surface roughening, there is mechanical surface roughening in which the surface is mechanically roughened by a rotating nylon brush, electrical surface roughening in which an alternate current is applied in an acidic electrolyte to electrolytically roughen the surface, and the like.

Next, the lithographic printing plate base is anodic oxidation processed, and, as required, after subjecting to hydrophilic treatment with a sodium silicate solution, a plate-making layer forming liquid is coated onto the roughened surface and dried so as to form a photosensitive, heat sensitive, or photopolymerizable plate-making layer, to give a lithographic printing web.

The obtained lithographic printing web is slit and chopped to specific dimensions, to make lithographic printing plates.

EXAMPLES

1. Example 1, Comparative Example 1

Example 1

Using a pure aluminum dedicated melting furnace as the melting furnace, 16 tonnes of waste lithographic printing plate cut into fine pieces with one side at about 50 cm length, and 3 tonnes of new ingots of pure aluminum were introduced and melted at 650° C. to 750° C. The pure aluminum dedicated melting furnace employed was a 20 tonne capacity open well type direct heating method furnace.

Out of the introduced waste lithographic printing plates, the proportion by weight of the unused lithographic printing plates to the used lithographic printing plates was 1:1. Note that cutting waste arising in lithographic printing plate manufacturing processing was used as the unused lithographic printing plates, and lithographic printing plates collected from a customer, after plate making and printing, were used as the used lithographic printing plates.

The trace component content of the obtained regenerated metal (referred to below as "regenerated metal 1") is as set out in Table 1 below.

TABLE 1

|  | Trace Component Content (% by Weight) | | | |
| --- | --- | --- | --- | --- |
|  | Si | Fe | Cu | Mn |
| Regenerated Metal 1 (Example 1) | 0.08 | 0.29 | 0.020 | 0.002 |
| Regenerated Metal 2 (Example 2) | 0.17 | 0.31 | 0.028 | 0.039 |

Comparative Example 1

Similar procedures where used as in the Example 1, except for using as the melting furnace a similar 20 tonne capacity direct heating type melting furnace that had been used for manufacturing an Al—Mn alloy, without cleaning the inside with pure aluminum.

The trace component content of the obtained regenerated metal (referred to below as "regenerated metal 2") are as set out in Table 1.

As is clear from Table 1, it can be seen that the regenerated metal 1 that had employed the pure aluminum dedicated melting furnace has smaller Si, Fe, Cu, and Mn contents in comparison to the regenerated metal 2 that had employed the melting furnace that had been used for manufacturing an Al—Mn alloy, without cleaning the inside with pure aluminum.

2. Example 2, Comparative Example 2

The component ratios of traces of elements of bases used in grade A and B, these being typical grades for lithographic printing plates, and those of new metal (pure aluminum) are shown in Table 2 below.

TABLE 2

|  | Trace Component Content (% by Weight) | | | |
| --- | --- | --- | --- | --- |
|  | Si | Fe | Cu | Mn |
| Lithographic Printing Plate (Grade A) | 0.08 | 0.27 | 0.035 | 0.003 |
| Lithographic Printing Plate (Grade B) | 0.07 | 0.31 | 0.015 | 0.002 |
| New Metal (Pure Aluminum) | 0.06 | 0.08 | 0.002 | 0.0001 |

As can be seen from Table 1 and Table 2, in the bases of Grade A and Grade B, the Si content is 0.08% by weight and 0.07% by weight, respectively, which is the same as or lower than, the Si content of 0.08% by weight in the regenerated metal 1 according to the Example 1.

Further, the Fe content in the bases of Grade A and Grade B is 0.27% by weight and 0.31% by weight, respectively, with the Fe content of the base of Grade A being less than the Fe content in the regenerated metal 1 according to the Example 1.

Then, the regenerated metals 1 and 2 were diluted with new metal, Si, Fe, Cu, and Mn added as trace components to prepare a metal for use as a base for a lithographic printing plate of grade B. When doing so, the proportions by weight of the regenerated metal and new metal, and the trace component addition amounts, are shown in Table 3. Note that the proportions of the regenerated metals show the maximum proportion in condition that the addition amounts all of the Si, Fe, Cu, and Mn become positive.

TABLE 3

|  | Metal Proportion (% by Weight) | | Addition Amounts of Trace Components (% by weight) | | | |
| --- | --- | --- | --- | --- | --- | --- |
|  | Regenerated Metal | New Metal | Si | Fe | Cu | Mn |
| Regenerated Metal 1 (Example 2) | 65 | 35 | 0.001 | 0.094 | 0.002 | 0.006 |
| Regenerated Metal 2 (Comparative Example 2) | 5 | 95 | 0.014 | 0.219 | 0.013 | 0.001 |

As shown in Table 3, for example, when preparing the metal for the base of the lithographic printing plate of Grade B, in the case of the regenerated metal 1, 65% by weight of the regenerated metal was able to be used against 35% by weight of new metal, however, in the case of the regenerated metal 2, in contrast, only 5% by weight of the regenerated metal was able to be used against 95% by weight of new metal.

Thus, the regenerated metal of the present invention has Si, Fe, Cu, and Mn contents that are all smaller, in comparison to a regenerated metal prepared by using a melting furnace that had been used for manufacturing an Al—Mn alloy without cleaning inside with pure aluminum, and so, when preparing metal for a lithographic printing plate from a regenerated metal and a new metal, the proportion of the regenerated metal added to the new metal can be increased in comparison to the later regenerated metal. Consequently, the amount of a new metal that is costly can be reduced.

3. Example 3

The melting time per tonne, and the regenerated yield of the regenerated metal, were measured for Example 1, while varying the average size of the waste lithographic printing plates within a range of from 0.5 cm square to 100 cm square. The regeneration yield is defined as the % by weight of regenerated metal obtained with respect to the introduced waste lithographic printing plates. The results thereof are shown in Table 4.

TABLE 4

| | Waste PS Plate Size (1 side, cm) | | | | | |
|---|---|---|---|---|---|---|
| | 0.5 | 1 | 2 | 30 | 60 | 100 |
| Melting Time per Tonne (Minutes) | 30 | 40 | 50 | 60 | 60 | 120 |
| Regeneration Yield (%) | 80 | 92 | 95 | 96 | 96 | 96 |

As shown in Table 4, the melting time per tonne was 30 to 40 minutes due to the average size of waste lithographic printing plates being a small size from 0.5 cm square to 1 cm square, and was 50 to 60 minutes for 2 cm square to 60 cm square. However, for 100 cm square it was as long as 120 minutes. However, the regeneration yield was 80% when the average size of the waste lithographic printing plate was 0.5 cm square, 92% when 1 cm square, 95% when 2 cm square, and 96% when 30 cm square to 100 cm square.

Consequently, it can be seen that the average size of the waste lithographic printing plates is preferably in the range of from 2 cm square to 60 cm square, considering the balance between the melting time per tonne and the regeneration yield.

4. Example 4

The regeneration yield was investigated using unused lithographic printing plates as the waste lithographic printing plates, while changing the proportion by weight of photosensitive layer, interleaving paper, internal packaging materials and adhesive tape (referred to below as "photosensitive layer, interleaving paper and the like"). The results thereof are shown in Table 5.

TABLE 5

| | Total Amount of Photosensitive Layer, Interleaving Paper, and the like (% by weight) | | | | | |
|---|---|---|---|---|---|---|
| | 0 | 0.5 | 1 | 2 | 2.5 | 5 |
| Regeneration Yield (%) | 96 | 96 | 95 | 90 | 85 | 81 |

As is clear from Table 5, when the proportion of photosensitive layer, interleaving paper and the like is 1% by weight or lower, the regeneration yield was 95% to 96%, when the proportion of photosensitive layer, interleaving paper and the like was 2% by weight or lower, the regeneration yield was 90%, when 2.5% by weight it was 85%, and when 5% by weight it was 81%.

It can be seen from these results that the incorporated amount of photosensitive layer, interleaving paper and the like is preferably 1% by weight or lower.

5. Example 5

The melting time per tonne and the regenerated metal regeneration yield was measured for the Example 1, while varying the melting temperature in the range of from 650° C. to 760° C. The results thereof are shown in Table 6.

TABLE 6

| | Melting Temperature (° C.) | | | |
|---|---|---|---|---|
| | 650 | 680 | 750 | 760 |
| Melting Time Per Tonne (Minutes) | 200 | 70 | 60 | 40 |
| Regeneration Yield (%) | 96 | 96 | 96 | 92 |

As the melting temperature was varied to 650° C., 680° C., 750° C., and 760° C., the melting time per tonne shortened to 200 minutes, 70 minutes, 60 minutes and 40 minutes, and the regeneration yield of metal varied to 96%, 96%, 96% and 92%.

From the above results, the melting time is too long when the melting temperature is 650° C., due to the aluminum in the molten metal oxidizing when the melting temperature is 760° C., regeneration yield of metal falls.

Consequently, it can be seen that the melting temperature is preferably in the range of 680 to 750° C.

6. Example 6

As the melting furnace, a 20 tonne capacity Si free furnace of direct heating type was employed, lined with heat resistant tiles not containing Si.

First, cleaning, by introducing ingots of pure aluminum into the Si free furnace, melting, and then taking out the introduced pure aluminum, was carried out 1 or 2 times.

Next, 10 tonnes of waste lithographic printing plates were added at a time into the Si free furnace, and regenerated metal was manufactured. The melting temperature was from 680° C. to 750° C.

A comparison was then made to the Example 4 shown in paragraphs [0017] to [0021] and Table I of Japanese Patent No. 3420817. In the Example 4 of the above patent publication, the incorporated ratio of waste lithographic printing plate was also 100%, however a standard melting furnace was employed rather than a Si free furnace. Pure aluminum cleaning of the melting furnace was not performed, the waste lithographic printing plates were introduced into the above melting furnace and melted, and after treating the molten metal with gas and filtering, regenerated metal was made as ingots. The results are shown in Table 7.

TABLE 7

| | Regeneration Yield (%) | Number of Measurement Times | Melting Operation Duration |
|---|---|---|---|
| Example 6 | 95% | 3 times | 9 hours |
| U.S. Pat. No. 3,420,817 | 85% | 13 times | 14 hours |

As shown in Table 7, it can be seen that fewer number of measurement times sufficed in the present Example in comparison to when employing a standard melting furnace without performing cleaning with pure aluminum, the regeneration yield was high, and the melting operation duration can be greatly shortened.

The invention claimed is:

1. A metal regeneration method comprising:
a melting furnace cleaning step of melting pure aluminum with an aluminum content of 99.5% by weight or higher in a melting furnace to clean the inside of the melting furnace; and
a metal regeneration step of melting waste lithographic printing plates selected from unused lithographic printing plates and used lithographic printing plates, in the melting furnace whose inside has been cleaned by the melting furnace cleaning step, to obtain regenerated metal,
wherein in the melting furnace cleaning step, pure aluminum is introduced into the melting furnace, and after the introduced pure aluminum has melted, substantially the whole amount of the pure melted pure aluminum is removed from a molten metal extraction outlet of the melting furnace so as to clean the inside of the melting furnace.

2. The metal regeneration method of claim 1, wherein the size of the waste lithographic printing plates used in the metal regeneration step is from 2 to 60 cm square.

3. The metal regeneration method of claim 1, wherein a Si free furnace whose furnace walls do not contain Si is employed as the melting furnace.

4. The metal regeneration method of claim 1, wherein the temperature for melting the waste lithographic printing plates in the metal regeneration step is 680 to 750° C.

5. The metal regeneration method of claim 1, wherein a total amount of photosensitive layer, photosensitive layer protection material, and packaging material is 1% by weight or lower in the waste lithographic printing plate used in the metal regeneration step.

* * * * *